US012167737B2

(12) United States Patent
Tassi et al.

(10) Patent No.: US 12,167,737 B2
(45) Date of Patent: Dec. 17, 2024

(54) MACHINE FOR MAKING LIQUID OR SEMI-LIQUID FOOD PRODUCTS

(71) Applicant: ALI GROUP S.R.L.—CARPIGIANI, Cernusco sul Naviglio (IT)

(72) Inventors: Federico Tassi, Bologna (IT); Roberto Lazzarini, Reggio Emilia (IT)

(73) Assignee: ALI GROUP S.R.L.—CARPIGIANI

( * ) Notice: Subject to any disclaimer, the term of this patent is extended or adjusted under 35 U.S.C. 154(b) by 791 days.

(21) Appl. No.: 17/333,470

(22) Filed: May 28, 2021

(65) Prior Publication Data

US 2021/0368821 A1    Dec. 2, 2021

(30) Foreign Application Priority Data

May 29, 2020    (IT) .......................... 102020000012931

(51) Int. Cl.
*A23G 9/22*    (2006.01)
*A23G 9/16*    (2006.01)
(Continued)

(52) U.S. Cl.
CPC ................ *A23G 9/228* (2013.01); *A23G 9/16* (2013.01); *G06F 16/9035* (2019.01); *G06F 21/32* (2013.01); *A23G 9/163* (2013.01)

(58) Field of Classification Search
CPC . A23G 9/228; A23G 9/14; A23G 9/16; A23G 9/163; A23N 1/02; A47J 19/025
See application file for complete search history.

(56) References Cited

U.S. PATENT DOCUMENTS 6,193,153 B1    2/2001    Lambert
2007/0262081 A1    11/2007    Feola
(Continued)

FOREIGN PATENT DOCUMENTS

CN    101028916 A    9/2007
CN    108348094 A    7/2018
(Continued)

OTHER PUBLICATIONS

Italian Search Report dated Feb. 11, 2021 from counterpart Italian Patent Application No. 102020000012931.
(Continued)

*Primary Examiner* — Reginald Alexander
(74) *Attorney, Agent, or Firm* — SHUTTLEWORTH & INGERSOLL, PLC; Timothy J. Klima

(57) ABSTRACT

Described is a machine for making liquid or semi-liquid food products, including a first container for processing a liquid or semi-liquid base product defining a processing chamber and a stirrer for mixing the product of the first processing container. The machine also includes a plurality of detection devices designed to detect a quantity or an operating parameter of said machine and to generate a signal representative of the quantity or of the operating parameter. The machine includes a processing and control unit configured to receive the representative signals and to derive an operating condition of the machine based on the signals. The machine also includes a user interface connected to the processing and control unit and comprising a single control operable by an operator to selectively perform power on and power off of the machine.

13 Claims, 3 Drawing Sheets

(51) Int. Cl.
    *G06F 16/9035*    (2019.01)
    *G06F 21/32*      (2013.01)

(56) References Cited

U.S. PATENT DOCUMENTS

| | | | |
|---|---|---|---|
| 2009/0133106 A1 | 5/2009 | Bentley et al. | |
| 2012/0312049 A1* | 12/2012 | Downs, III | A23G 9/20 |
| | | | 62/340 |
| 2014/0263415 A1* | 9/2014 | San Miguel | A23G 9/283 |
| | | | 222/1 |
| 2017/0042178 A1* | 2/2017 | Black | A23G 9/228 |
| 2018/0098555 A1* | 4/2018 | Grampassi | A23G 9/228 |
| 2019/0125122 A1* | 5/2019 | Feola | A23G 9/08 |
| 2019/0287102 A1* | 9/2019 | Cocchi | H04L 9/0618 |
| 2020/0134960 A1 | 4/2020 | Kingston et al. | |
| 2020/0339407 A1* | 10/2020 | Caiano | B67D 1/06 |
| 2022/0211072 A1* | 7/2022 | Tran | A23G 9/22 |

FOREIGN PATENT DOCUMENTS

| | | | |
|---|---|---|---|
| CN | 108402273 A | 8/2018 | |
| CN | 110074249 A | 8/2019 | |
| CN | 110269127 A | 9/2019 | |
| EP | 2082649 A2 | 7/2009 | |
| EP | 2197291 A1 | 6/2010 | |
| WO | 2019077153 A1 | 4/2019 | |
| WO | 2019158753 A1 | 8/2019 | |

OTHER PUBLICATIONS

Chinese Office Action dated Aug. 23, 2024 from counterpart CN App No. 202110599749.2.

* cited by examiner

MACHINE FOR MAKING LIQUID OR SEMI-LIQUID FOOD PRODUCTS

This application claims priority to Italian Patent Application 102020000012931 filed May 29, 2020, the entirety of which is incorporated by reference herein.

BACKGROUND OF THE INVENTION

This invention relates to a machine for processing liquid or semi-liquid food products such as, for example, artisan ice cream, soft-ice cream, milkshakes, whipped cream, creams, chocolate, yogurts and the like.

The invention also relates to a method for operating a machine for making, storing and/or distributing liquid or semi-liquid food products.

SUMMARY OF THE INVENTION

There are prior art machines comprising at least one container for processing a liquid or semi-liquid product and a stirrer configured for mixing the product inside the container.

Usually, the processing container is also equipped with thermal treatment means configured for cooling and/or heating the liquid or semi-liquid product in such a way that the latter can be dispensed outside the machine using a dispensing device.

As is known, the operating conditions of these machines are controlled by an operator using a push-button panel positioned on the machine frame.

In fact, in use, after the machine has been operated, an operator varies the operating parameters (such as, for example, stirrer speed or processing temperature) by typing on the push-button panel and, if necessary, carries out a visual control regarding the correct operation of some components.

Disadvantageously, these machines comprise drawbacks linked to the level of hygiene safety.

To be able to switch on/off or adjust the machine, the operator must use the push-button panel positioned close to the machine; this results in a hygiene risk both for the operator and for the liquid or semi-liquid product.

The push-button panel is normally used by a plurality of operators, thus being a vehicle for bacteria and dirt. In addition, since the push-button panel is located close to the machine, the operator must stay close to it for a long time in such a way as to be able to adjust its operation and, if necessary, ensure that all the components work correctly. This could result in risks to the food safety of the liquid or semi-liquid product, especially in the case of an operator who has symptoms of a poor state of health.

The technical purpose of the invention is therefore to provide a machine for making liquid or semi-liquid products and a method for operating the machine which are able to overcome the drawbacks of the prior art.

The aim of the invention is therefore to provide a machine for making liquid or semi-liquid products and a method for operating the machine which reduce to a minimum the contact between the machine and the operator in such a way as to increase the level of hygiene and food safety.

The technical purpose and aims specified are substantially achieved by a machine for making liquid or semi-liquid food products and by a method for operating the machine comprising the technical features set out in one or more of the accompanying claims. The dependent claims correspond to possible embodiments of the invention.

More specifically, the technical purpose is achieved by an machine for making liquid or semi-liquid food products comprising a first container for processing a liquid or semi-liquid product defining a processing chamber, a stirrer for mixing the product of the first processing container and a plurality of detection devices designed to measure a quantity or an operating parameter of the machine and to generate a signal representing the quantity or the operating parameter itself. The machine also comprises, according to the invention, a processing and control unit configured for receiving the representative signals and deriving on the basis of the signals an operating condition of the machine and a user interface connected to the processing and control unit and comprising a single control which can be activated by an operator to selectively perform a switching on and off of the machine.

Preferably, the command can be selected between: a mechanical pushbutton; a virtual button, preferably a touch-screen button.

Preferably, any external function other than (that is, different to) switching on or off is controlled by a remote control device. Even more preferably, every other operation different from switching on or off is controlled by a remote control device outside the machine and configured to allow an operator to display the representative signals and send to the processing and control unit instructions for variation of the operating condition of the machine.

Advantageously, the contact between the operator and the machine is limited to the time necessary for pressing the command in such a way as to switch the machine off or on, thus minimizing any risk of contamination of the food product.

More specifically, therefore, the processing and control unit 5 is configured for receiving commands relating to any other function other than switching on or off using a remote control device.

In that sense, the processing and control unit (5) is equipped with an interface (Wi-Fi, radio waves, Bluetooth, cable, etc.) for receiving commands from said remote control device. In a preferred embodiment, the machine also comprises a database containing identification data relating to the biometric profiles and/or the voice patterns of one or more predetermined operators authorized to use the machine. The machine also comprises an identification system integrated in the user interface and configured to capture an identification data item of an operator and to send the identification data item to the processing and control unit in order to verify the presence of the identification data item in the database.

In this way, the machine is able to recognize whether or not the operator is authorized to use the machine, in such a way that, in the case of an operator not authorized, the switching on or off by means of the single control can be inhibited.

Preferably, the machine also comprises detection means, such as, for example, a thermal camera, configured for measuring at least one physical parameter of an operator, for example the body temperature, and for enabling or inhibiting access to the machine by the operator as a function of the value of the parameter measured.

If, for example, an operator has a body temperature greater than 37.5°, the machine prevents the operator from acting by means of the single control for switching the machine on or off.

The detection means can be inserted in the machine alternatively or in addition to the identification system. In this second case, the detection means act as a further control on the operator who can operate on the machine. In fact, in use, the operator is first recognized by the identification system and, if identified as present in the database among the authorized operators, he/she is subjected to measurement of his/her body parameter by the detection means. If the parameter is acceptable (for example, below or above a predetermined threshold) the operator can have access to the switching on or off of the machine; if it is not, the access is inhibited.

In the case of authorized access, the operator can switch the machine on/off whilst each external function other than switching on and off is performed remotely, that is to say, far from the machine.

In other words, the machine has, integrated in it, a single control designed for switching on and off the machine whilst all the other commands relating to other functions can be controlled remotely.

Advantageously, the machine has a high level of hygiene and sanitary safety which makes it possible to not stop production even in cases in which a high standard of sanitary safety is required, such as, for example, in the case of health emergencies.

BRIEF DESCRIPTION OF THE DRAWINGS

Further features and advantages of the invention are more apparent in the non-limiting description which follows of an embodiment of a machine for making liquid or semi-liquid food products and of a method for operating the machine.

The description is set out below with reference to the accompanying drawings which are provided solely for purposes of illustration without restricting the scope of the invention and in which.

DESCRIPTION OF THE PREFERRED EMBODIMENTS

Figure 1:
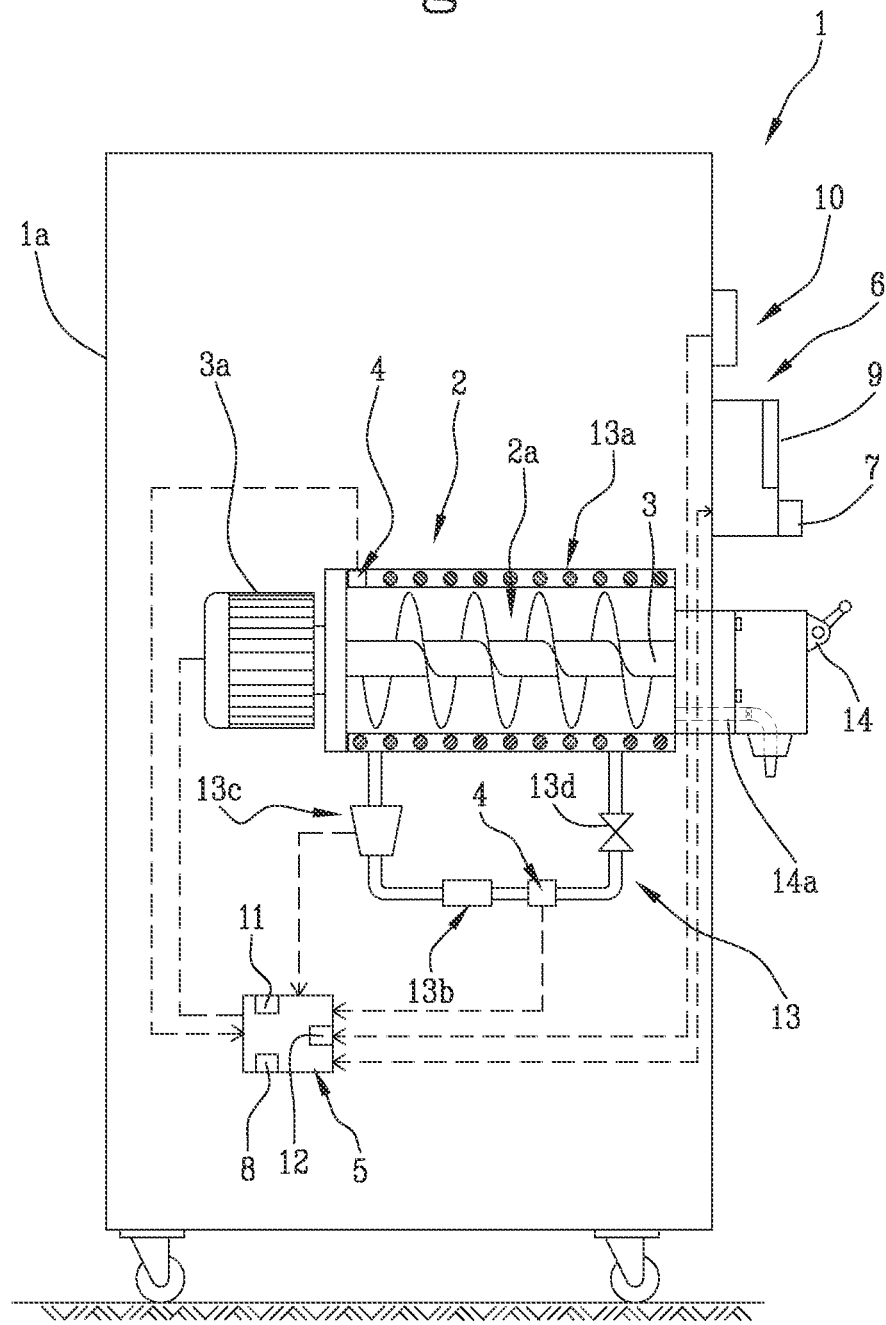
FIG. 1 is a schematic view of a first embodiment of a machine according to the invention.

With reference to the accompanying drawings, the numeral 1 denotes a machine for making liquid or semi-liquid food products according to the invention.

The term "liquid or semi-liquid products" is used to mean ice cream, pastry and similar products (by way of a non-limiting example: ice cream, soft ice cream, granita, sorbet, shake, yogurt, frozen dessert, cold creams).

These food products may be made from any basic mixture (liquid, semi-liquid, in powder) with the addition, if necessary, of further liquid products of any kind (e.g. water).

As shown in the accompanying drawings, the machine 1 comprises a frame 1a substantially in the shape of a parallelepiped inside of which is positioned a first container 2 for processing a liquid or semi-liquid product defining a processing chamber 2a.

Preferably, the first processing container 2 is a mixing and cooling cylinder with a horizontal axis where the liquid or semi-liquid product is introduced to be thermally treated and then dispensed.

Figure 2:
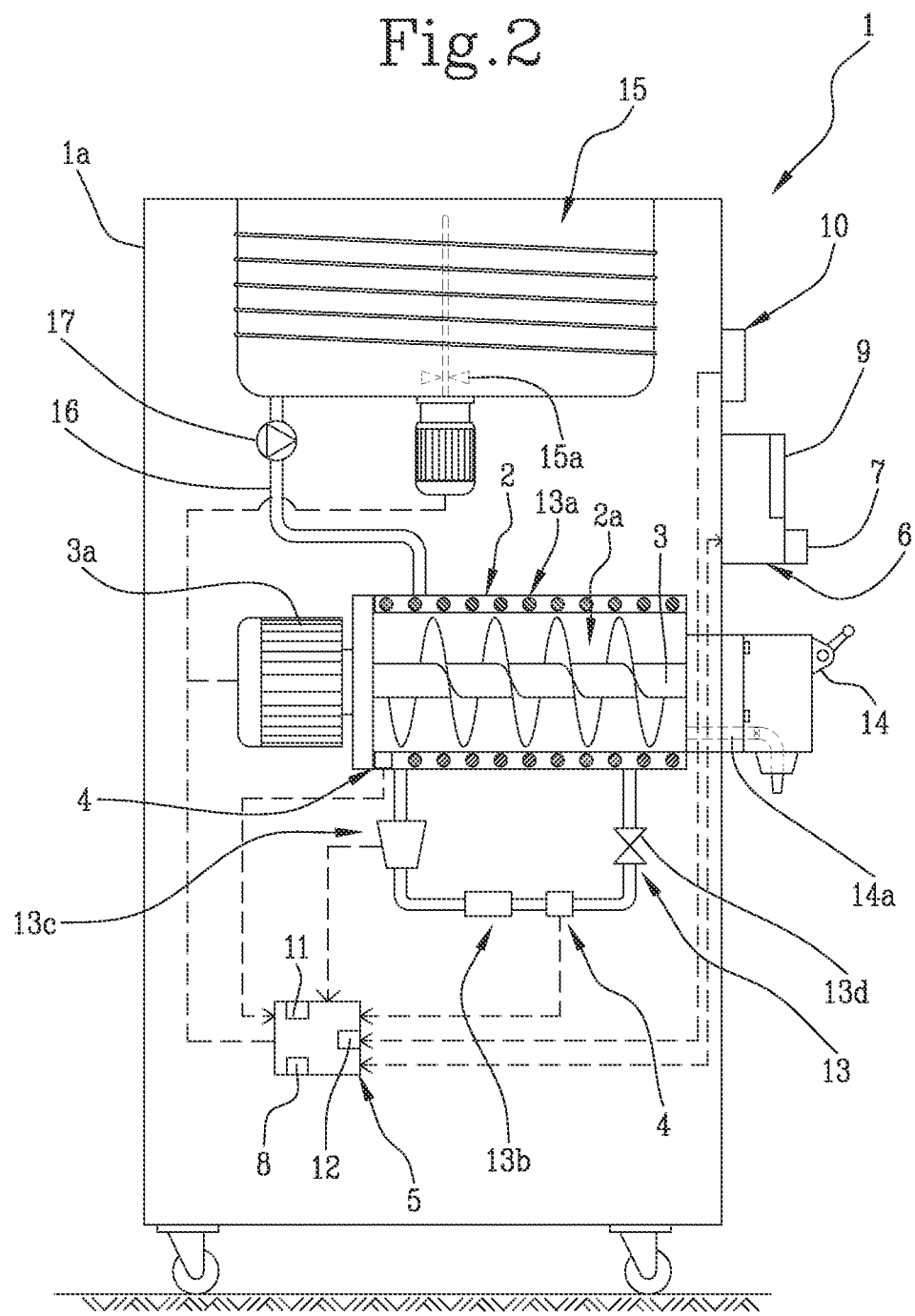
FIG. 2 is a schematic view of a second embodiment of a machine according to the invention.

In an alternative embodiment, shown in FIG. 2, the semi-liquid liquid product is first introduced in a further container 15 provided with a mixing element 15a.

The further container 15 is used substantially to pasteurize the liquid or semi-liquid product, which is then transferred into the first processing container 2 through a duct 16 equipped with a transfer pump 17.

The machine 1 also comprises a stirrer 3 configured for mixing the product of the first processing container 2.

Preferably, the stirrer 3 is associated with a drive unit 3a configured to rotate the stirrer 3 inside the processing container 2 in such a way as to mix the food product. The stirrer 3 also has the scraper function, that is to say, it is operates on the inside walls of the processing chamber 2 for removing the layers of ice.

Preferably, the machine 1 also comprises a thermal plant 13 comprising a heat exchanger 13a associated with the first processing container 2 in such a way as to keep the liquid or semi-liquid product at a temperature of between −12° C. and +5° C.

Still more preferably, the thermal plant 13 also comprises a further heat exchanger 13b, a compressor 13c and a pressure reduction element 13d.

It should be noted that the heat exchanger 13a, the further heat exchanger 13b, the compressor 13c and the pressure reduction element 13d define a circuit containing a heat carrier fluid.

As illustrated in the accompanying drawings, the machine 1 also comprises a dispenser 14 connected, by a duct 14a, to the first container 2 for processing the liquid or semi-liquid product to allow the product to be extracted. The dispenser 14 is installed on an external wall of the frame 1a of the machine 1 in such a way that it can be maneuvered easily when the product is dispensed.

Preferably, the dispenser 14 can be activated by an operator through a lever connected to a shutter (not illustrated) in such a way as to allow or inhibit the passage of the product along the duct 14a towards the outside of the machine 1. Alternatively, the dispenser 14 may be activated by an operator by means of a voice command in such a way that the shutter is controlled by the operator simply by use of his/her voice.

Figure 3:
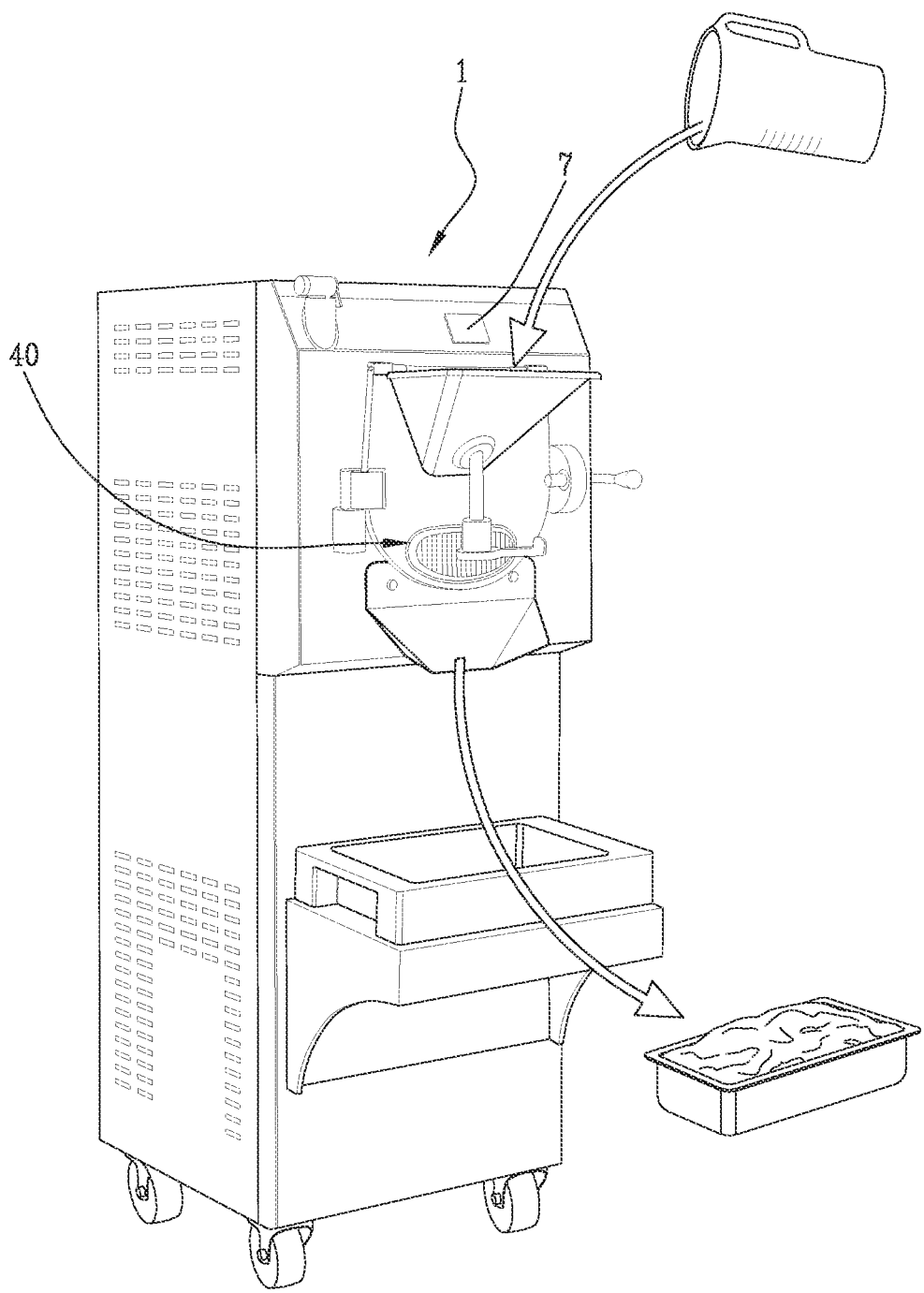
FIG. 3 is a schematic view of a third embodiment of a machine according to the invention.

Alternatively, the dispenser 14 may be replaced by a discharge hatch 40, as shown in FIG. 3.

It should be noted that, more generally speaking, any further control with the exception of the switching on/off may be of the voice type.

Advantageously, this latter embodiment allows the contact between the operator and the machine 1 to be further reduced.

As shown in the accompanying drawings, the machine 1 also comprises a plurality of detection devices 4 designed to measure a quantity or an operating parameter of the machine 1 and to generate a signal representing the quantity or the operating parameter.

Preferably, the detection devices 4 are made in the form of sensors and are positioned close to various components of the machine 1 in such a way as to measure a suitable quantity or operating parameter, for example the temperature of the product or its density or composition or a quantity and/or weight of the product.

In one embodiment, at least one of the detection devices 4 is configured to make available a signal representing the weight of the liquid or semi-liquid product inside the first processing container 2. Thanks to the presence of the detection device 4, the operator is able to know when the first processing container 2 is empty and it is therefore necessary to fill it with other liquid or semi-liquid food product.

According to an embodiment, at least one of the detection devices 4 comprises a pressure switch: in that case, the pressure switch detects the variation of the pressure of the air due to the increase in the volume of the liquid and/or semi-liquid mixture inside the processing container.

Advantageously, the presence of the detection device 4 prevents the operator from having to manually remove, at predetermined time intervals, part of the machine 1 in such a way as to control the level of product present in the first processing container 2.

Advantageously, the presence of the detection device 4 therefore prevents a direct contact between the operator and the food product contained in the first container 2 since the operator accesses the latter only when the food product is finished and the first processing container 2 is therefore empty.

The presence of detection devices 4 configured to make available a signal representative of the weight is particularly advantageous also if the machine 1 comprises a plurality of processing containers 2, for example of the bag-in-box type or flexible pockets or rigid containers, each containing a different basic product (in powder, liquid or semi-liquid). In this situation, for each processing container 2 there is a respective detection device 4 which allows the operator to understand which flavor of liquid or semi-liquid product is about to end or has finished in such a way as to replace/fill only that processing container 2 without having to check each one of the processing container 2 at regular intervals.

In the preferred embodiment, at least one of the detection devices 4 is also configured to make available a signal representative of the characteristic composition of the liquid or semi-liquid product contained in the first processing container 2. The detection device 4 interfaces with a memory module 12 comprising identification data of a plurality of liquid or semi-liquid food products and characteristic compositions corresponding to the identification data, so as to recognize the liquid or semi-liquid product by comparing the characteristic composition detected with the identification data present in the memory module 12.

In other words, the machine 1 is able to recognize the type of food product present in the first processing container 2 comparing the signal coming from the detection device 4 with the database of data relating to various compositions and therefore to various products present in the memory module 12.

The machine 1 may also comprise one or more amongst: level measuring devices 4 (not illustrated), designed to measure a level of product inside the first container 2, flow rate measuring devices 4 (not illustrated), designed to measure the flow rate of the basic mixture introduced/extracted from the first container 2 and pressure measuring devices 4, designed to measure a pressure of the product inside the processing container 2 and/or a pressure of the heat carrier fluid given by the compressor 13c, devices for detecting the temperature of any component of the machine or the product being processed.

The representative signals generated by the detection devices 4 are received by a processing and control unit 5 inside the machine 1 and configured to derive on the basis of the signals an operating condition of the machine 1.

For example, thanks to the signal deriving from the detection device 4 relative to the composition of the liquid or semi-liquid product, the processing and control unit 5 recognizes the type of product contained in the first processing container 2 and derives a suitable operating condition of the machine 1 relative to the product.

In other words, in light of the signal deriving from the detection device 4, the processing and control unit 5 is able to establish the operating parameters suitable for processing the liquid product, such as, for example: a speed of rotation of the stirrer 3, a temperature inside the first processing container 2, a processing time and the like.

Advantageously, thanks to the cooperation of the detection devices 4 with the processing and control unit 5, the machine 1 is able to auto-set, that is to say, automatically define an adequate operating condition, depending on the type of liquid or semi-liquid product, without the need for any intervention by the operator.

In order to reduce to a minimum the contact between the operator and the machine 1 and to make the contact safe, the machine 1 comprises a user interface 6 equipped with a single control for starting/stop the processing cycle (and not a plurality of commands, as in the prior art machines) connected to the processing and control unit 5.

Preferably, as shown in the accompanying drawings, the user interface 6 is positioned on an outer wall of the frame 1a of the machine 1 in such a way as to be easily accessible by an operator.

According to the invention, the user interface 6 comprises a single control 7 which can be activated by an operator to selectively perform a switching on and off of the machine 1.

It should be noted that said single control 7 can also advantageously be used for emergency stopping of the machine, when the machine is operating.

Preferably, the single control 7 is selectable between: a mechanical pushbutton; a virtual button, preferably a touch-screen button; a command of the voice recognition type.

Advantageously, the presence of a single control 7 minimizes the contact time between the operator and the machine 1 since that time is reduced to merely the activation of the single control 7 (only switching on/off time).

In a preferred embodiment, the user interface 6 also has, integrated in it, an identification system 9 configured for acquiring an identification data of an operator and for sending the identification data to the processing and control unit 5.

A database 8 containing identification data relating to biometric profiles and/or voice patterns and/or data relative to the facial appearance of one or more predetermined operators authorized to use the machine 1 is stored in the processing and control unit 5.

The identification data coming from the identification system 9 is compared with the data present in the database 8 in such a way as to check the presence in the database 8.

In other words, the identification system 9 is able to detect a certain identifier of the operator, such as, for example, fingerprint, retina pattern or voice pattern, and compare this data with data stored in the database 8 containing the identification data relative to the biometric profiles and/or voice patterns of one or more predetermined operators authorized to use the machine 1.

When the machine 1 is switched on or off, the operator is positioned close to the user interface 6 in such a way that the identification system 9 detects a certain identification of the operator. If the identification data matches with data contained in the database 8, the operator is recognized as authorized to operate on the machine 1 and can therefore activate the single control 7 to selectively switch on and off the machine 1.

The control unit of the machine is therefore configured to perform the above-mentioned operations.

If, on the other hand, the identification data is not present in the database 8, the machine 1 prevents activation of the single control 7 and the operator cannot therefore switch the machine 1 on or off. In this situation, the user interface 6 might produce an error signal, for example in the form of a visual message, if the interface 6 has a small display, or in the form of a sound.

Advantageously, the presence of the identification system 9 contributes to increasing the hygiene safety of the machine 1 since only predetermined operators can operate on it.

Alternatively or in addition to the identification system 9, the machine 1 comprises detection means 10 configured for measuring at least one physical parameter of the operator and for enabling or inhibiting access to the machine 1 by the operator as a function of the value of the parameter measured.

Preferably, the detection means 10 are for example (non-limiting) selectable between: pressure measuring devices, temperature measuring devices and/or blood saturation measuring devices, whilst the physical parameters measured are, for example: body temperature, blood pressure and level of oxygenation of the blood.

Advantageously, the detection means 10 act as control to ensure that the operator is suitable for selectively operating a switching on or off of the machine 1 by means of the single control 7.

In the case of the preferred embodiment, the machine 1 comprises both the identification system 10 and the detection means 9 in such a way as to perform a double control on the suitability of the operator to switch the machine 1 on or off.

In this situation, an operator positions his/herself close to the user interface 6 in such a way that the identification system 9 can detect a user identification parameter and compare it with those present in the database 8. If the parameter is not present, the operator is not suitable to operate on the machine 1 which therefore prevents the functionality of the single control 7 for switching on and off.

On the other hand, if the identification parameter is present in the database 8, the detection means 10 are activated in such a way as to measure at least one physical parameter of the operator. If the parameter is acceptable, the operator can operate on the single control 7 in such a way as to switch the machine 1 on or off. On the other hand, if the parameter is not acceptable, the machine 1 prevents the switching on or off and, if necessary, produces the error signal.

Advantageously, the cooperation between the identification system 9 and the detection means 10 make the machine 1 hygienically safe since only users selected and deemed healthy can operate on it.

As already mentioned, every other function other than switching on or off is controlled by remote control in such a way as to reduce to a minimum the time of interaction between the operator and the machine.

Preferably, the remote control is performed using a remote control device (not illustrated) outside the machine 1 and configured to allow an operator to display the representative signals, coming from the detection devices 4, and sending to the processing and control unit 5 instructions for variation of the operating condition of the machine 1.

Preferably, the exchange of the data relating to the representative signals between the processing and control unit 5 and the remote control device occurs thanks to a receiving and transmitting module 11 installed on the machine 1.

In other words, the receiving and transmitting module 11 is configured to allow an exchange of data between the remote control device and the processing and control unit 5 in such a way as to allow the operator to intervene in order to change the operating conditions of the machine 1 processed automatically by the processing and control unit 5.

Preferably, the remote control device can be selected from between: a tablet, a smartphone, a dedicated controller.

Preferably, if a tablet or a smartphone is used, the operator displays the signals coming from the detection devices 4 and, if necessary, modifies the operating conditions of the machine 1 by using an application specially created.

In other words, therefore, the machine 1, thanks to the possibility of performing an exchange of signals between the processing and control unit 5 and the detection devices 4, is able, once switched on by the operator, to auto-set, establishing a predetermined operating condition based on these signals. If it is necessary to change this operating condition, the operator acts on the machine 1 remotely using the remote control device, changing the necessary parameters.

It should be noted that, in any case, the user does not use only the pushbutton present on the machine for adjustments but uses, if necessary, an interface outside the machine (mobile phone, tablet, PC, etc.).

Advantageously, the possibility of controlling remotely any function of the machine 1, other than the switching on/off, allows the machine 1 to be used even in critical medical situations, such as, for example, in the case of epidemics.

In a preferred embodiment, the machine 1 also comprises a timer (not illustrated) configured for starting an operation for cleaning the machine 1.

Preferably, in fact, the machine 1 comprises an automatic cleaning system (not illustrated), that is to say, which is able to autonomously perform a cleaning operation in such a way that the operator does not have to dismantle the machine 1 and therefore enter into contact with it or with its components.

Preferably, the timer is programmable using the remote control device.

In other words, by using the remote control device, the timer may be programmed in such a way as to activate the cleaning system to perform a cleaning of the machine 1, and mainly of the processing container 2 and of the duct 14a connecting the container 2 with the dispenser 14, every time it is necessary.

Advantageously, the presence of the programmable timer contributes to facilitating the cleaning of the machine 1 whilst maintaining a high level of food safety of the entire machine.

The invention achieves the preset aims eliminating the drawbacks of the prior art.

More specifically, the machine 1 is hygienically safe as it is switched on or off by a single control 7 which can be activated by an operator recognized as health and suitable for operating the machine 1.

The machine 1 is also safe in terms of hygiene because every other function other than switching on or off, which would therefore require a greater interaction with the machine, is controlled remotely.

What is claimed is:

1. A machine for making liquid or semi-liquid food products, comprising:
a first processing container for processing a liquid or semi-liquid product, the first processing container defining a processing chamber;
a stirrer for mixing the product in the first processing container;
a plurality of detection devices adapted to detect a quantity or an operating parameter of the machine and to generate a signal representative of the quantity or of the operating parameter;

a processing and control unit configured to receive the representative signals and to derive an operating condition of the machine based on the signals;

a user interface connected to the processing and control unit and comprising a single control operable by an operator to selectively perform power on and power off of the machine;

wherein the processing and control unit includes an interface configured to receive from a remote control device commands relating to any function other than power on or power off;

a detection device configured to measure a physical parameter of the operator and to enable or inhibit access to the machine by the operator as a function of a value of the physical parameter detected, the physical parameter being a body temperature.

2. The machine according to claim 1, wherein the single control is selectable from the following: a mechanical pushbutton; a virtual button, a touch-screen button.

3. The machine according to claim 1, and further comprising:

a database containing user identification data relating to the biometric profiles and/or voice prints of one or more specific operators authorized to use the machine, the database being stored in the processing and control unit;

an identification system integrated in the user interface and configured to capture an identification data item of the operator and to send the identification data item to the processing and control unit to verify a presence of the identification data item in the database.

4. The machine according to claim 1, and further comprising a remote management device external to the machine and configured to allow the operator to display the representative signals and to send to the processing and control unit instructions for varying the operating condition of the machine.

5. The machine according to claim 4, and further comprising a data receiving and transmitting module configured to allow data exchange between the remote management device and the processing and control unit.

6. The machine according to claim 4, wherein the remote management device is selectable from the following: a tablet, a smartphone, a dedicated controller.

7. The machine according to claim 4, and further comprising a timer configured to start a cleaning operation on the machine, the timer being programmable from the remote management device.

8. The machine according to claim 1, wherein at least one of the detection devices is configured to provide a signal representative of a weight of the liquid or semi-liquid base product inside the first processing container.

9. The machine according to claim 1, wherein at least one of the detection devices is configured to provide a signal representative of a characteristic composition of the liquid or semi-liquid base product inside the first processing container.

10. The machine according to claim 9, and further comprising a memory module comprising identification data of a plurality of liquid or semi-liquid food products and characteristic compositions corresponding to the identification data, the memory module being configured to be interfaced with the at least one of the detection devices so as to recognize the liquid or semi-liquid product by comparing the characteristic composition with the identification data.

11. The machine according to claim 1, and further comprising a thermal system comprising a heat exchanger thermally connected with the first processing container.

12. The machine according to claim 1, and further comprising a dispenser which is connected to the first processing container and which allows the product to be extracted therefrom.

13. A method for operating a machine for making liquid or semi-liquid food products, comprising the following steps:

providing:

a machine for making liquid or semi-liquid food products, comprising:

a first processing container for processing a liquid or semi-liquid product, the first processing container defining a processing chamber;

a stirrer for mixing the product in the first processing container;

a plurality of detection devices adapted to detect a quantity or an operating parameter of the machine and to generate a signal representative of the quantity or of the operating parameter;

a processing and control unit configured to receive the representative signals and to derive an operating condition of the machine based on the signals;

a user interface connected to the processing and control unit and comprising a single control operable by an operator to selectively perform power on and power off of the machine;

wherein the processing and control unit includes an interface configured to receive from a remote control device commands relating to any function other than power on or power off;

a detection device configured to measure a physical parameter of the operator and to enable or inhibit access to the machine by the operator as a function of a value of the physical parameter detected, the physical parameter being a body temperature;

powering the machine on or off using a single control operable by the operator, the single control being included in the user interface located on the machine and connected to the processing and control unit;

controlling all machine functions, other than powering the machine on or off, by the remote control device.

* * * * *